(12) United States Patent
Lee et al.

(10) Patent No.: US 7,443,372 B2
(45) Date of Patent: Oct. 28, 2008

(54) METHOD FOR DRIVING IN-PLANE SWITCHING MODE LIQUID CRYSTAL DISPLAY DEVICE

(75) Inventors: Jae Kyun Lee, Kyonggi-do (KR); Kyong Soek Kim, Kyonggi-do (KR)

(73) Assignee: LG DIsplay Co., Ltd., Seoul (KR)

( * ) Notice: Subject to any disclaimer, the term of this patent is extended or adjusted under 35 U.S.C. 154(b) by 714 days.

(21) Appl. No.: 10/879,207

(22) Filed: Jun. 30, 2004

(65) Prior Publication Data

US 2005/0001807 A1    Jan. 6, 2005

(30) Foreign Application Priority Data

Jul. 3, 2003    (KR) ..................... 10-2003-0044921

(51) Int. Cl.
*G09G 3/36* (2006.01)
(52) U.S. Cl. ........................................ 345/96; 345/209
(58) Field of Classification Search .................. 345/96, 345/100, 87, 204, 92, 209
See application file for complete search history.

(56) References Cited

U.S. PATENT DOCUMENTS

2001/0011981 A1* 8/2001 Yamamoto et al. ............ 345/87
2005/0001808 A1* 1/2005 Lee .............................. 345/96

* cited by examiner

*Primary Examiner*—Amr Awad
*Assistant Examiner*—Stephen G Sherman
(74) *Attorney, Agent, or Firm*—Birch, Stewart, Kolasch & Birch, LLP

(57) ABSTRACT

A method for driving an IPS mode LCD device prevents leakage current by swing of a common voltage. The IPS mode LCD device includes multiple gate and data lines crossing each other to define a plurality of pixel regions, multiple thin film transistors (TFT) alternately positioned at lower and upper side pixel regions adjacent to the corresponding gate line, and multiple common lines in a zigzag type along the thin film transistors in the pixel regions. A common voltage is applied so that a first common voltage or a second common voltage is inversely applied to even numbered common lines or odd numbered common lines in one vertical period to be synchronized with a scanning signal supplied to the first gate line, and a gate Low voltage applied to each gate line is lower than a pixel voltage on transition of the common voltage from "High" to "Low".

5 Claims, 17 Drawing Sheets electric field paralled to substrates

Data voltage to $V_{com}$ voltage of pixel

METHOD FOR DRIVING IN-PLANE SWITCHING MODE LIQUID CRYSTAL DISPLAY DEVICE

This application claims the benefit of Korean Application No. P2003-44921, filed on Jul. 3, 2003, which is hereby incorporated by reference.

BACKGROUND OF THE INVENTION

1. Field of the Invention

The invention pertains to an In-Plane switching (IPS) mode liquid crystal display (LCD) device, and more particularly, to a method for driving an IPS mode LCD device, to prevent a leakage current by a common voltage swing.

2. Discussion of the Related Art

Demand for various display devices have increased with the development of an information society. Accordingly, many efforts have been made to research and develop various flat display devices such as a liquid crystal display (LCD), a plasma display panel (PDP), an electroluminescent display (ELD), and a vacuum fluorescent display (VFD). Some types of flat display devices have already been utilized as displays for various types of equipment.

Among the various flat display devices, liquid crystal display (LCD) devices find the most wide use due to the advantageous characteristics of thin profile, lightness of weight, and low power consumption. The LCD devices thus provide a substitute for a Cathode Ray Tube (CRT). In addition to mobile type LCD devices such as a notebook computer display, LCD devices have been developed for computer monitors and televisions to receive and display broadcasting signals.

Despite various technical developments in the LCD technology for applications in different fields, research in enhancing the picture quality of the LCD device has been, in some respects, lacking as compared to other features and advantages of the LCD device. In order to use LCD devices in various applications as a general use display, the key to developing LCD devices depends on the LCD device producing a high quality picture, including high resolution and high luminance with a large-sized screen, while still maintaining lightness of weight, a thin profile, and low power consumption. Currently, active matrix-type LCD devices have been developed because of their high resolution and image quality, and these devices have thin film transistors and pixel electrodes are arranged in a matrix-type configuration.

In general, an LCD device includes an LCD panel for displaying an image and a driver for supplying a driving signal to the LCD panel. In addition, the LCD panel includes first and second substrates bonded to each other to have a cell gap therebetween. A liquid crystal layer is formed between the first and second substrates. The first substrate (TFT array substrate) includes multiple gate lines arranged along a first direction at fixed intervals, multiple data lines arranged along a second direction perpendicular to the first direction at fixed intervals, multiple pixel electrodes arranged in a matrix-type configuration within pixel regions defined by crossing of the gate and data lines, and multiple thin film transistors that are activated according to signals supplied to the gate lines for transmitting signals from the data lines to the pixel electrodes. Also, the second substrate (color filter array substrate) includes a black matrix layer that excludes light from portions of the first substrate except at the pixel regions, an R/G/B color filter layer for displaying various colors, and a common electrode for producing the image. A cell gap is maintained between the first and second substrates by spacers, and the first and second substrates are bonded together by a sealant. A liquid crystal is injected between the first and second substrates. Also, the driver for applying the signal to the LCD panel includes a gate driver for applying a scanning signal to the gate line, and a source driver for applying a signal to the data line. The gate and data drivers are controlled by a timing controller.

Driving the LCD device is in accordance to the optical anisotropy and the polarizing characteristics of the liquid crystal material. Liquid crystal molecules are aligned using directional characteristics, because the liquid crystal molecules have anisotropic long and thin shapes. An induced electric field controls the alignment direction of the liquid crystal molecules of the liquid crystal layer. Light irradiated through the liquid crystal layer may be accordingly controlled by the alignment direction of the liquid crystal molecules, thereby displaying the image.

As discussed above, if the pixel electrode is formed on the first substrate and the common electrode is formed on the second substrate, the liquid crystal layer is driven by an electric field perpendicular to the first and second substrates. Thus, it is difficult to obtain a wide viewing angle. However, an In-Plane Switching (IPS) mode LCD device drives the liquid crystal layer by using an electric field parallel to the first and second substrates, thereby providing a wide viewing angle. For example, along a frontal direction of the IPS mode LCD device, a viewer can have a viewing angle of 70° in all directions (i.e., lower, upper, left, and right directions). Compared to general TN (twisted nematic) mode LCD devices, IPS mode LCD devices have simplified fabrication process steps, and reduced color shift.

The related art In-Plane switching (IPS) mode LCD device will now be described with reference to the accompanying drawings. FIG. 1 is a cross-sectional view schematically illustrating the related art IPS mode LCD device. As shown in FIG. 1, the related art IPS mode LCD device includes first and second substrates 1 and 2 being opposite to each other, and a liquid crystal material layer 3 between the first and second substrates 1 and 2. A thin film transistor (TFT) array is formed on the first substrate 1 in a matrix-type configuration. Although not shown, a drain electrode of the thin film transistor is connected to a pixel electrode 20, and a common electrode 30 is formed spaced apart from the pixel electrode 20. In addition, the second substrate 2 includes a black matrix layer (not shown) that prevents light leakage from portions of the first substrate 1 except where the pixel regions are located, and also includes a color filter layer for displaying various colors. In the related art IPS mode LCD device, the pixel electrode 20 and the common electrode 30 are formed along the same plane, whereby the liquid crystal layer is driven by an induced electric field parallel to the first and second substrates 1 and 2. FIG. 1 also shows a surface 10 of the substrate 1.

Driving the related art IPS mode LCD device will be described as follows. In the related art LCD devices including the IPS mode LCD device, respective pixels are arranged in a matrix-type configuration. That is, when a scanning signal is supplied to one gate line, a video signal is supplied to the pixel corresponding to the gate line. The liquid crystal material injected between the first and second substrates 1 and 2 may deteriorate when a DC voltage is applied for an extended period of time. In order to prevent this problem, the polarity of the supplied voltage is cyclically changed, which is commonly referred to as a polarity inversion method. The polarity inversion method is classified into a frame inversion method, a line inversion method, a column inversion method, and a dot inversion method.

In the frame inversion method, positive and negative polarities of data voltage are supplied to the liquid crystal material as a common electrode voltage being alternately supplied to each frame. For example, if a positive (+) polarity data voltage is supplied to an even frame, then a negative (−) polarity data voltage is supplied to an odd frame. Thus, the same polarity data voltage is supplied according to the even or odd frame, thereby decreasing consumption current during the switching mode. However, the frame inversion method is sensitive to flicker generated according to an asymmetrical transmittance between the positive and negative polarities. In addition, the frame inversion method is susceptible to crosstalk caused by interference between data signals of adjacent pixels.

The line inversion method finds common use in low-resolution devices (i.e., VGA (video graphic array) and SVGA (super video graphics array) devices), in which a data voltage is supplied such that the polarity of data voltage supplied to the liquid crystal material for a common electrode voltage is changed according to a vertical direction. For example, in a first frame, a positive (+) polarity data voltage is supplied to an odd gate line, and a negative (−) polarity data voltage is supplied to an even gate line. Next, in a second frame, the negative (−) polarity data voltage is supplied to the odd gate line, and a positive (+) polarity data voltage is supplied to the even gate line. In the line inversion method, the polarities of the data voltage are oppositely supplied to adjacent lines such that the luminance difference is offset between the lines according to spatial averaging, thereby preventing flicker during frame inversion. For example, the opposite-polarity data voltages are supplied along a vertical direction, whereby a coupling phenomenon of the data signals is offset, thereby decreasing vertical crosstalk during the frame inversion. However, the polarity of the data voltage is the same along a horizontal direction, so that horizontal crosstalk is generated, and consumption current increases due to an increase of the number of switching operations, as compared with that during the frame inversion.

In the column inversion method, the same polarity of data voltage supplied to liquid crystal material for a common electrode voltage is supplied in the vertical direction, and positive and negative polarities of the data voltage are alternately supplied along the horizontal direction. It is thus possible to both minimize flicker by spatial averaging and to minimize horizontal crosstalk. However, the column inversion method requires a high-voltage column drive IC because the opposite-polarity data voltages are supplied to the adjacent lines according to the vertical direction.

The dot inversion method finds applications in high-resolution devices (i.e., XGA (extended graphics array), SXGA (super extended graphics array), and UXGA (ultra extended graphics array) devices) for obtaining the greatest quality picture image. In the dot inversion method, the polarity of data voltage is differently supplied to all-direction adjacent pixels. It is accordingly possible to minimize flicker by spatial averaging. However, the dot inversion method is problematic since the dot inversion method uses a high-voltage driver that results in a high consumption current.

The related art IPS mode LCD device of the dot inversion method will now be described. FIG. 2 shows a layout of a pixel of the related art IPS mode LCD device. FIG. 3 depicts a cross-sectional view taken along line I-I' of FIG. 2. FIG. 4 shows a cross-sectional view taken along line II-II' of FIG. 2.

Referring to FIG. 2, the related art IPS mode LCD device includes multiple gate and data lines 40 and 50 crossing each other to define multiple pixel regions, multiple common lines 60 spaced apart from the multiple gate lines 40, multiple thin film transistors (TFT) respectively formed at crossing portions of the multiple gate and data lines 40 and 50, multiple pixel electrodes 20 connected with respective drain electrodes of the thin film transistors and arranged as a "1-shaped" region within pixel regions, and a common electrode 30 formed as an "inverted U-shaped" spaced apart from the pixel electrode 20 within the pixel region and connected with the common line 60.

A method for manufacturing a related art IPS mode LCD device can be described with reference to FIG. 3 and FIG. 4. First, a metal layer is deposited on an entire surface of a substrate 10, and then it is selectively removed to thereby form both the gate line 40 having a gate electrode projected along a horizontal direction, and the common line 60 along the same direction as the gate line 40 and spaced apart by a predetermined interval from the gate line 40. Then, a gate-insulating layer 25 is formed on the entire surface of the substrate 10 including the gate line 40 and the common line 60. A semiconductor layer (not shown) is subsequently formed on the gate-insulating layer 25 above the gate electrode. Then, a metal layer is formed on the substrate 10 including the gate insulating layer 25 and the semiconductor layer, and then selectively removed to form the data line 50 perpendicular to the gate line 40 and source/drain electrodes 50c. Accordingly, a thin film transistor (TFT) having a gate electrode, a semiconductor layer, and source/drain electrodes 50c is formed on the substrate 10.

Next, a passivation layer 35 is formed on the entire surface of the substrate 10 including the data line 50, and contact holes are formed in the passivation layer 35 corresponding to the drain electrode 50c of the TFT and a predetermined portion of the common line 60. A metal layer is then deposited on an entire surface of the passivation layer 35, and patterned to form the pixel electrode 20 that connects to the drain electrode 50c of the TFT, and the common electrode 30 that connects to the common line 60 spaced apart from the pixel electrode 20. The common electrode 30 is accordingly in contact with the underlying common line 60 to provide power to the common electrode 30. A data voltage is also supplied to the pixel electrode 20 according to a conductive state of the TFT. In addition, the common lines 60 connect to one another, and the same common voltage signal Vcom (which is a DC voltage) is applied to the common lines 60.

FIG. 5 shows a circuit diagram equivalent to that of FIG. 2. FIG. 6 depicts a timing diagram of the pixel voltage according to each gate line. FIG. 5 shows a unit pixel of the related art IPS mode LCD device, and a storage capacitor Cst is formed between the storage line 60 and the drain electrode 50c of the TFT formed between of the gate and data lines 40 and 50. A liquid crystal capacitor $C_{LC}$ is then formed between the pixel electrode 20 and the common electrode 30, and the storage capacitor Cst is connected in parallel to the liquid crystal capacitor $C_{LC}$.

FIG. 6 shows that the common voltage Vcom signal is maintained at a constant level even though the signal voltage of the pixel or the gate line 40 is changed, or the frame is changed. In this state, the common voltage Vcom signal maintains an intermediate level between two level voltages applied to the data lines. The polarity of the voltage applied to the data line is inversely applied to the respective pixels in the horizontal direction. That is, the data voltage is applied such that positive (+) and negative (−) polarities for the Vcom are inversely applied to the respective pixels by alternately applying positive (+) and negative (−) polarity data voltages to the data lines crossing the gate lines. The same polarity of the data voltage is applied at this time to respective odd data lines, or respective even data lines.

In order to drive the corresponding pixel, a gate driver (not shown) applies a selected pulse through the gate line, and a source driver (not shown) applies a video signal to the thin film transistor turned on by a signal line. By applying the data voltage by the turned-on thin film transistor, the liquid crystal capacitor $C_{LC}$ and the storage capacitor Cst connected between the drain electrode of the thin film transistor and the common line are charged during the turning-on of the thin film transistor. After turing-off the thin film transistor, electric charges are maintained until the thin film transistor is turned-on. Therefore, when the thin film transistor is turned-on, the data voltage is applied to the pixel electrode through the thin film transistor and is charged into the liquid crystal capacitor and the storage capacitor. Also, the data voltage is not applied to the pixel electrode when the thin film transistor is turned off, and electric charges of the data voltage are maintained by the liquid crystal capacitor and the storage capacitor until the thin film transistor is turned-on.

FIG. 6 shows a pixel voltage that is changed by a difference amount ΔVp according to a parasitic capacitor Cgs formed between the gate and source electrodes of the thin film transistor along a falling edge of the scanning signal supplied to the gate line, whereby the difference amount ΔVp induces an alignment direction of the liquid crystal material.

FIG. 7 shows a view illustrating a polarity change for a common voltage in respective pixels according to odd frame/even frame of a related art IPS mode LCD device. Referring to FIG. 7, when the dot inversion method drives the IPS mode LCD device, polarity (i.e., data voltage for common voltage) is inversely supplied to adjacent pixels so that the polarities of the adjacent pixels are opposite to each other. Whenever the frame is changed, the polarity of the pixel inverts. For example, the polarity of the pixel alternately changes to a positive (+) and negative (−) state different from the polarity of the adjacent pixel, thereby obtaining a high-quality picture image.

FIG. 8 shows a block diagram illustrating the inside of a gate driver in a related art IPS mode LCD device. FIG. 9 shows a view illustrating a TCP structure of a gate driver, and a timing diagram illustrating input/output signal changes on the TCP structure in a related art IPS mode LCD device.

FIG. 8 shows a gate driver of the related art IPS mode LCD device that includes a shift register part 61, a level shifter 62, and a buffer 63. The shift register part 61 includes multiple shift registers receiving a Gate Start Pulse signal GSP, a Gate Shift Clock signal GSC, and a Left/Right select signal L/R from a timing controller, whereby the shift registers are sequentially operated. Also, the level shifter 62 receives a Gate Output Enable signal (GOE) from the timing controller, and sequentially shifts the signals. The buffer 63 outputs signals for the gate lines (Gout1, Gout2, . . . , Goutn) that are supplied to the gate lines as one state selected from VGH, VGL, VCC and VSS levels.

Operation of the gate driver will be described with reference to FIG. 9. First, the shift register part 61 shifts the GSP signal by using the GSC signal, thereby sequentially enabling the gate lines. After completing enabling of the gate lines during one frame, a carry value is carried so that the gate lines of a second frame are enabled. Subsequently, the level shifter 62 sequentially level-shifts the signals supplied to the gate lines, and outputs the level-shifted signals to the buffer 63. Accordingly, the multiple gate lines connected to the buffer 63 are sequentially enabled. At this time, a predetermined gate line synchronized by the GSC signal is maintained at the VGH level, and then the predetermined gate line is maintained at the VGL level along a rising edge of the GOE signal.

Driving the related art IPS mode LCD device having the aforementioned gate driver will be described as follows. First, the source driver (not shown) sequentially receives video data signals of the respective pixels from the timing controller, and stores the video data signals corresponding to the respective data lines. Then, the gate driver sequentially supplies the scanning signals to the multiple gate lines by outputting the Gate Shift Clock signal (GSC), the Gate Shift Pulse signal (GSC), and the Gate Output Enable signal (GOE). Accordingly, the multiple thin film transistors connected to the selected gate line turn ON, whereby the video data signals (i.e., data voltage type) output from the source driver are supplied to the drain electrode of the thin film transistor to thereby display the video data on an LCD panel. Repetitive performance of the aforementioned process steps display the video data on the LCD panel. In this case, multiple pins from '1' to 'n' are sequentially formed at an output side of a gate driver Tape Carrier Package (TCP) to output signals for the gate lines.

However, the related art IPS mode LCD device has many disadvantages, some of which are described below.

When driving the related art IPS mode LCD device using the dot inversion method, a constant value is supplied to the common voltage signal in a DC state, and the positive (+) and negative (−) polarity data voltages for the common voltage signal are alternately supplied to the data lines of the respective pixels. The pixel voltage supplied to the liquid crystal accordingly has a polarity dependent on the data voltage, and it is necessary to use a source driver having a great output voltage difference in order to induce a high voltage to the liquid crystal material. The source driver of the IPS mode LCD device generally has an extended output using a constant voltage $V_{DD}$ power source of 15V. The pixel voltage supplied to the liquid crystal material is accordingly about (−)6V or (+)6V. However, since a source driver having a high output value is expensive, it has been necessary to obtain low power consumption by lowering the output value to thereby decrease manufacturing costs.

In an IPS mode LCD device, the liquid crystal material is driven according to a fringe field formed between the pixel electrode and the common electrode. It is accordingly necessary to form a fringe field having a great value by narrowing the interval between the pixel electrode and the common electrode. In order to narrow the interval between the pixel electrode and the common electrode, it becomes necessary to pattern the pixel and common electrodes to have a finger-type crossing at a predetermined interval. However, if the interval between the pixel electrode and the common electrode becomes narrow, then the aperture ratio of the pixel deteriorates. To improve the aperture ratio, the pixel or common electrode may be formed of a transparent material such as indium-tin-oxide (ITO). However, patterns having various shapes are formed within the pixel region so that it is difficult to uniformly transmit the light. When widening the interval between the pixel electrode and the common electrode for improving the aperture ratio, the electric field parallel to the substrates decreases between the pixel electrode and the common electrode. Thus, in order to obtain the required luminance, the output of the data voltage must be increased.

SUMMARY OF THE INVENTION

Accordingly, the invention is directed to an IPS mode LCD device and a method for driving the same that substantially obviates one or more problems due to limitations and disadvantages of the related art.

An object of the invention is to provide an IPS mode LCD device and a method for driving the same, in which a common voltage having an opposite polarity to that of a data voltage is applied to each common line in a state where thin film transistors (TFT) are alternately positioned at lower and upper side pixel regions adjacent to the corresponding gate line, and common lines (storage lines) are formed in a zigzag-type configuration along the TFTs, to increase a liquid crystal voltage between a common electrode and a pixel electrode without using a high-power source driver, and to prevent a leakage current by swing of the common voltage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The invention, in part, as embodied and broadly described herein, pertains to a method for driving an In-Plane switching (IPS) mode LCD device that includes multiple gate and data lines crossing each other to define multiple pixel regions, multiple thin film transistors (TFT) alternately positioned at lower and upper side pixel regions adjacent to the corresponding gate line, and multiple common lines in a zigzag-type configuration along the thin film transistors in the pixel regions. A common voltage is applied so that a first common voltage or a second common voltage is inversely applied to even numbered common lines or odd numbered common lines in one vertical period to be synchronized with a scanning signal supplied to the first gate line, and a gate Low voltage applied to each gate line is lower than a pixel voltage.

The invention, in part, pertains to a method for driving an In-Plane switching (IPS) mode LCD device that includes a plurality of gate and data lines crossing each other to define a plurality of pixel regions, multiple thin film transistors (TFT) alternately positioned at lower and upper side pixel regions adjacent to the corresponding gate line, and multiple common lines in a zigzag-type configuration along the thin film transistors in the pixel regions. A common voltage is applied so that a first common voltage or a second common voltage is inversely applied to even numbered common lines or odd numbered common lines in one vertical period for being synchronized with a scanning signal supplied to the first gate line, and a gate Low voltage applied to each gate line is lower than a pixel voltage on transition of the common voltage from "High" to "Low".

In the invention, the first common voltage and the second common voltage respectively applied to the even numbered common lines and the odd numbered common lines are level-shifted to the second common voltage and the first common voltage whenever the frame is changed.

In the invention, during a block between a transit point of the common voltage from "High" to "Low" and the next High voltage of the gate driving signal in the corresponding gate line, the Low voltage of the gate driving signal, applied to the corresponding gate line, is lower than the pixel voltage.

In the invention, the In-Plane switching (IPS) mode LCD device further includes first and second substrates being opposite to each other, and a liquid crystal material layer between the first and second substrates. The thin film transistors are formed over the first substrate in a matrix configuration.

It is to be understood that both the foregoing general description and the following detailed description of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

Hereinafter, an In-Plane switching (IPS) mode liquid crystal display (LCD) device according to the invention will be described with reference to the accompanying drawings.

Figure 1:
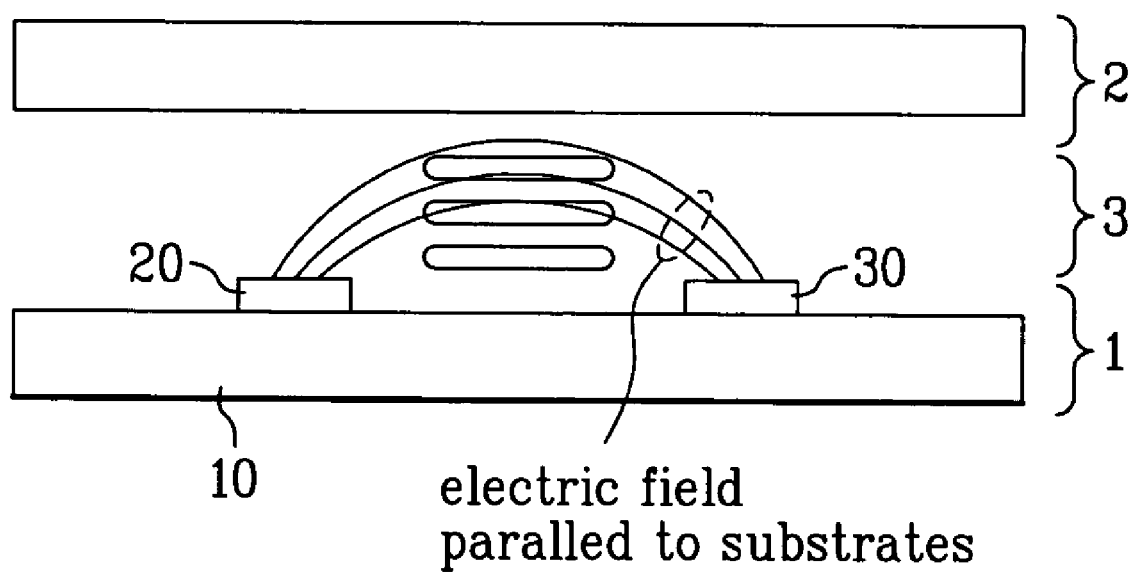
FIG. 1 shows a cross-sectional view illustrating a related art IPS mode LCD device.
Figure 2:
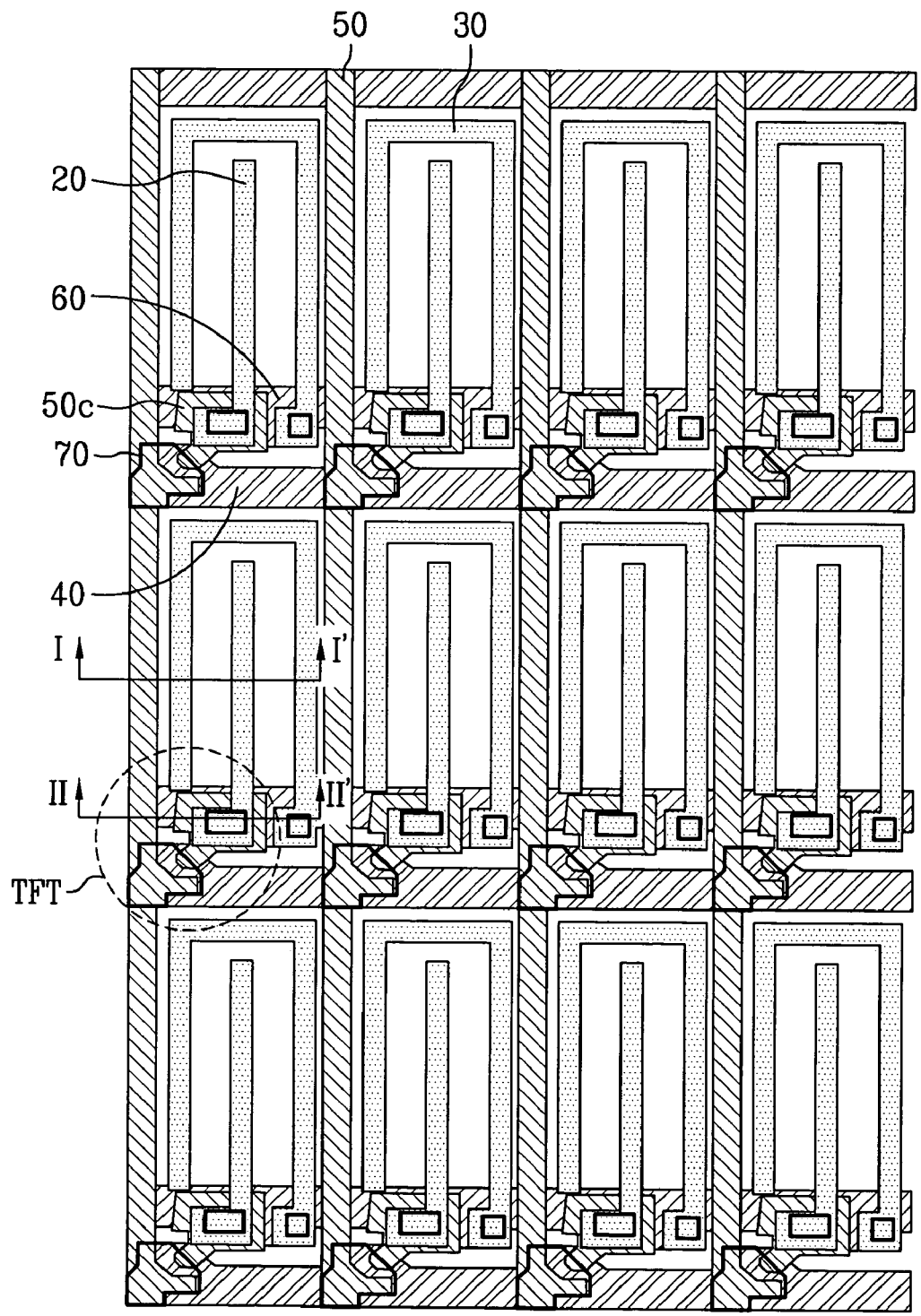
FIG. 2 shows a layout illustrating a pixel structure of a related art IPS mode LCD device.
Figure 3:
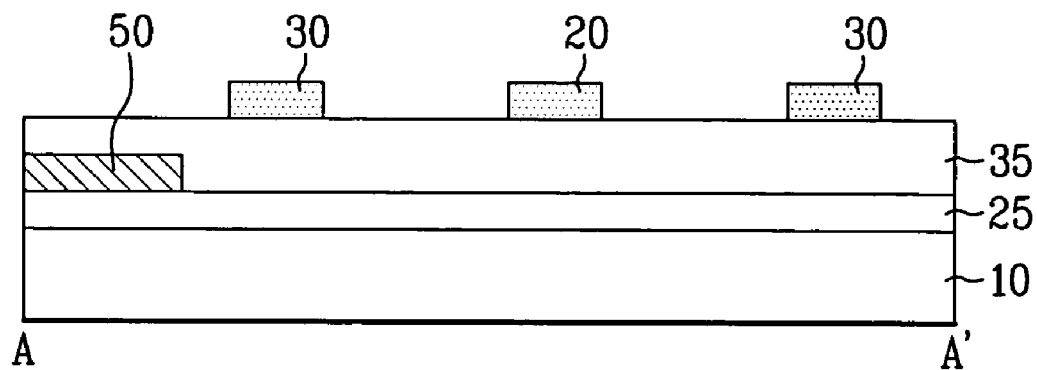
FIG. 3 shows a cross-sectional view taken along line I-I' of FIG. 2.
Figure 4:
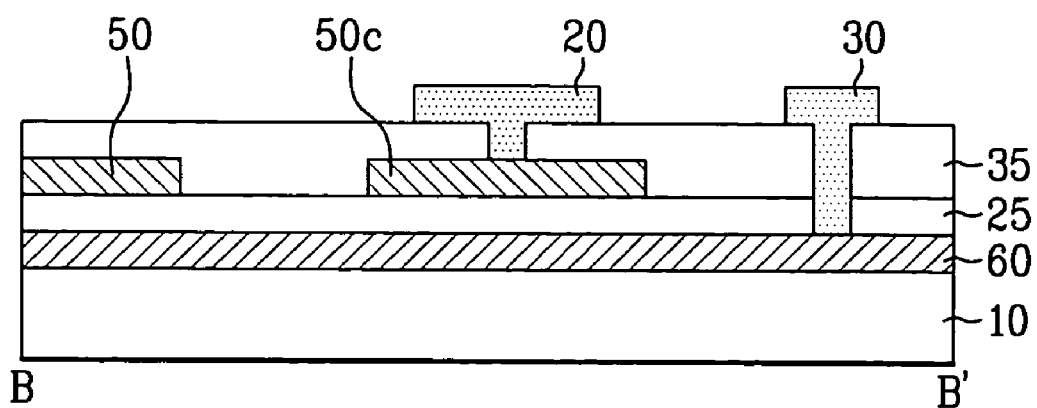
FIG. 4 shows a cross-sectional view taken along line II-II' of FIG. 2.
Figure 5:
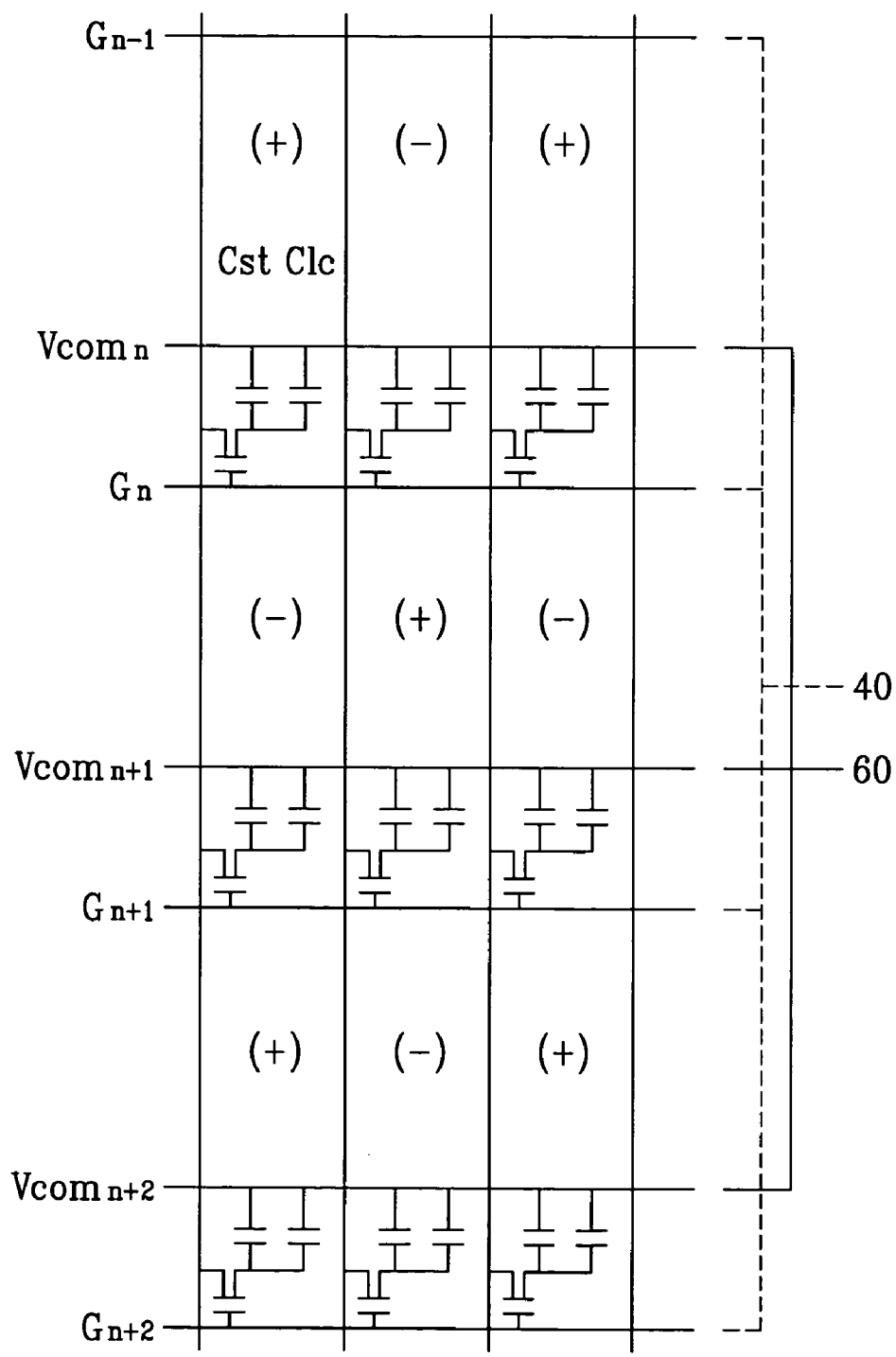
FIG. 5 shows an equivalent circuit diagram of a pixel structure of FIG. 2.
Figure 6:
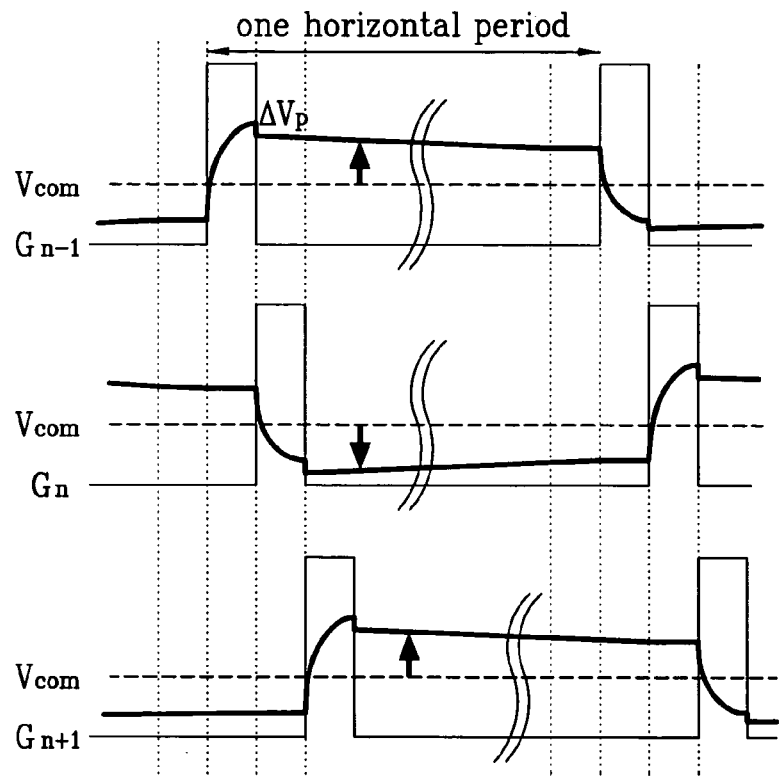
FIG. 6 shows a timing diagram illustrating a pixel voltage to a voltage signal applied to a gate line and a common line of FIG. 2.
Figure 7:
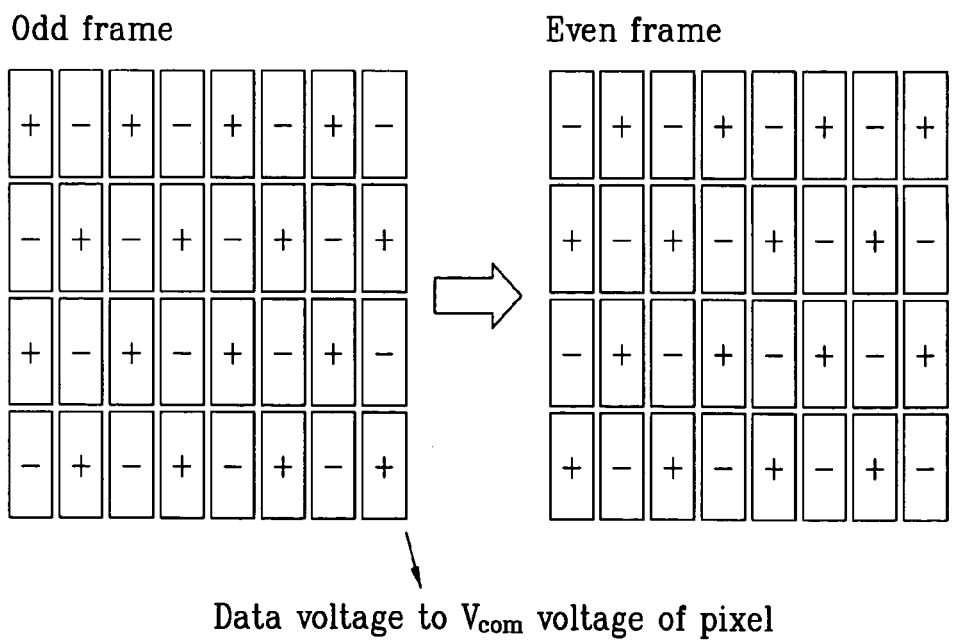
FIG. 7 shows a view illustrating a polarity change for a common voltage in respective pixels according to odd frame/even frame of a related art IPS mode LCD device.
Figure 8:
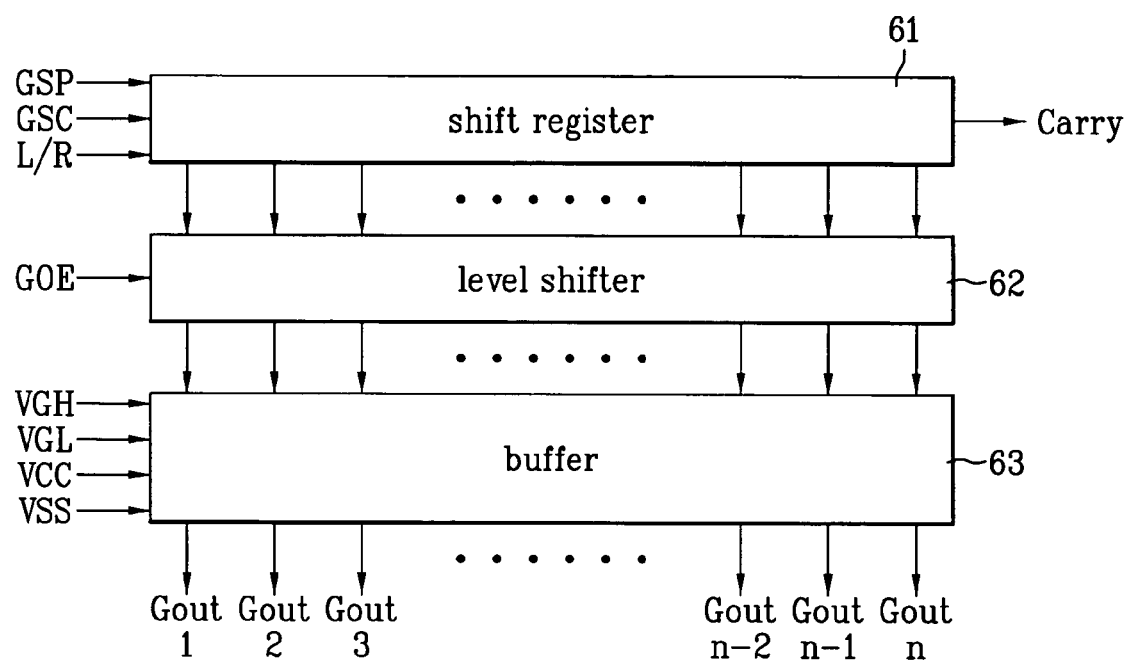
FIG. 8 shows a block diagram illustrating the inside of a gate driver in a related art IPS mode LCD device.
Figure 9:
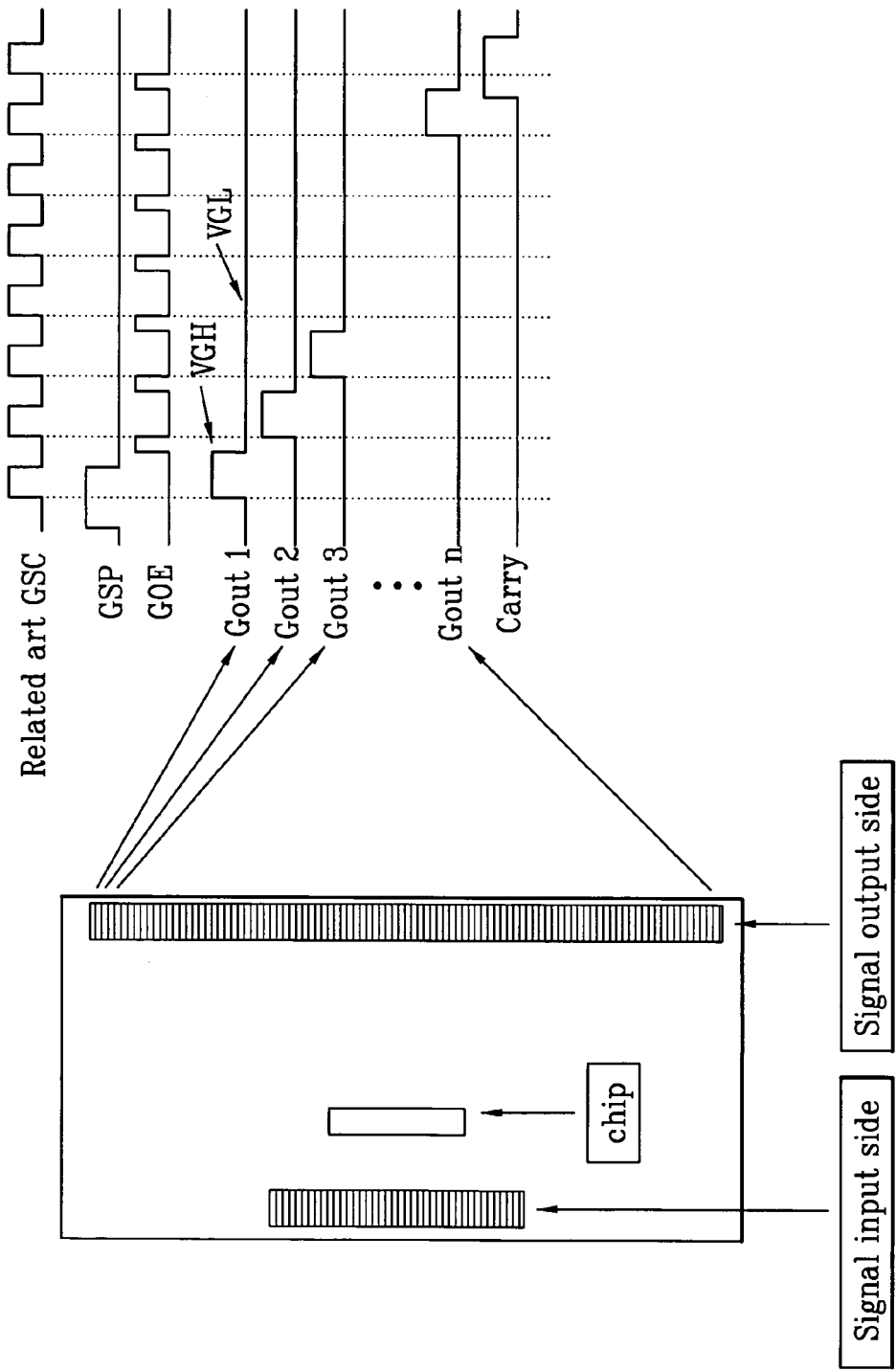
FIG. 9 shows a view illustrating a TCP structure of a gate driver, and a timing diagram illustrating input/output signal changes on the TCP structure in a related art IPS mode LCD device.
Figure 10:
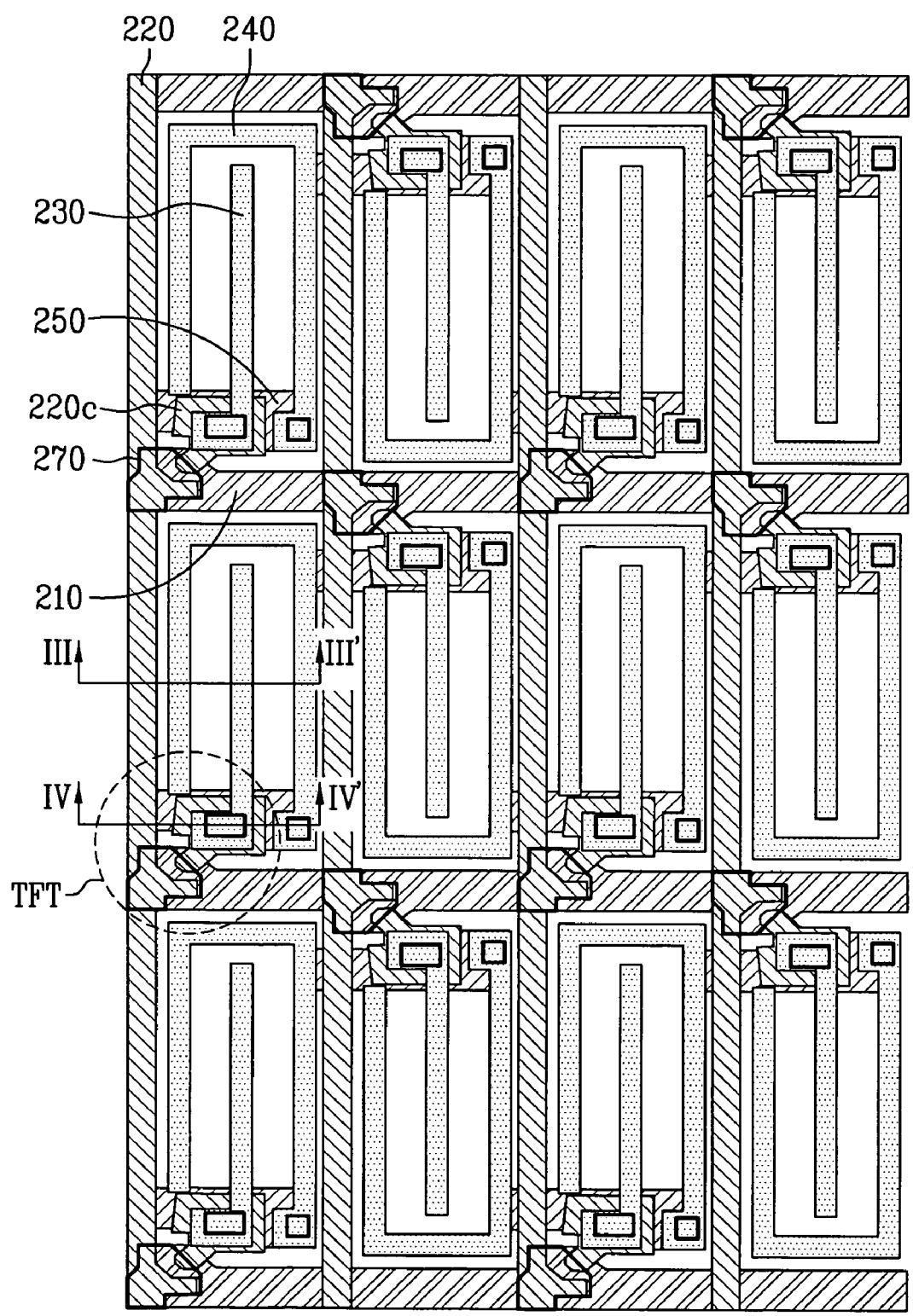
FIG. 10 shows a layout illustrating a pixel structure of an IPS mode LCD device according to a first embodiment of the invention.
Figure 11:
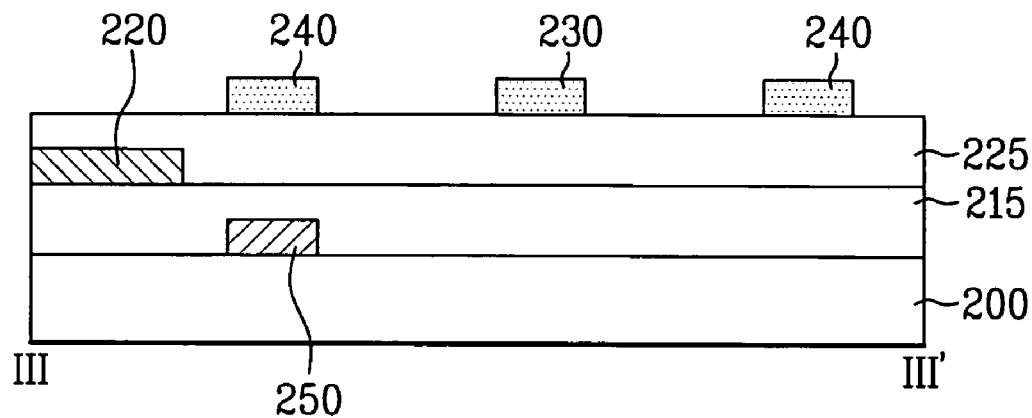
FIG. 11 shows a cross-sectional view taken along line III-III' of FIG. 10.
Figure 12:
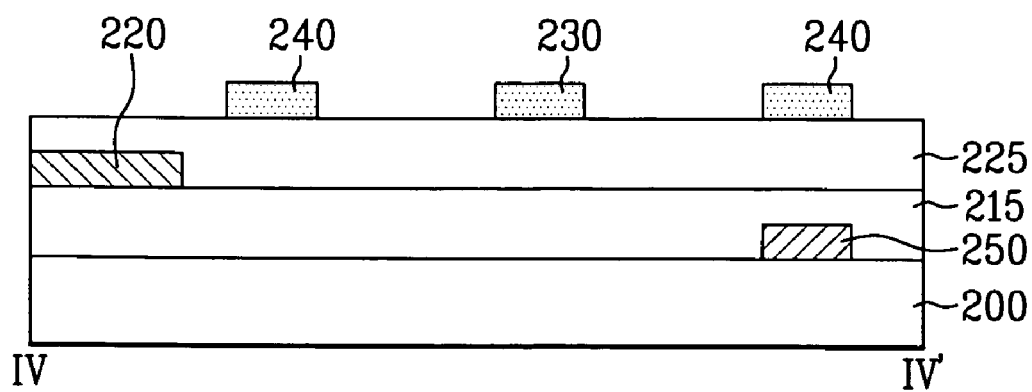
FIG. 12 shows a cross-sectional view taken along line IV-IV' of FIG. 10.

FIG. 10 shows a layout illustrating a pixel structure of an IPS mode LCD device according to a first embodiment of the invention. FIG. 11 shows a cross-sectional view taken along line III-III' of FIG. 10. FIG. 12 shows a cross-sectional view taken along line IV-IV' of FIG. 10. As shown in FIG. 10 to FIG. 12, the IPS mode LCD device according to the first embodiment of the invention includes multiple gate and data lines 210 and 220, multiple thin film transistors TFTs, multiple pixel electrodes 230, multiple common (storage) lines 250, and multiple common electrodes 240. The gate and data lines 210 and 220 are formed to cross each other, thereby forming multiple pixel regions. The thin film transistors TFTs are respectively formed at crossing portions of the gate and data lines such that the TFTs are alternately positioned at lower and upper side pixel regions adjacent to the corresponding gate line 210. Also, the pixel electrodes 230 connect to drain electrodes 220c of the respective TFTs, and the pixel electrodes 230 are respectively formed in the pixel regions to be parallel with the data lines 220. The common (storage) lines 250 are formed in a zigzag-type configuration to be parallel with the gate lines 210 along the TFT regions. The common electrodes 240 are respectively formed in the circumferences of the pixel regions at fixed intervals from the respective pixel electrodes 230, and the common electrodes 240 are respectively connected to the common lines 250.

In this configuration, the common electrode 240, being adjacent to the right side data line 220 of the pixel region, overlaps the lower side common line 250. The common line 250 includes a first common line and a second common line, where the first common line is formed in parallel with the gate line 210 along the respective TFT regions, and the second common line is connected to the first common line in parallel with the data line 220 to overlap with the common electrode 240 at the right side of the pixel region. Then, the first common line crosses the left side data line 220 of the pixel region. Also, the drain electrode 220c of the TFT overlaps the common line 250, thereby forming a storage capacitor.

Figure 13:
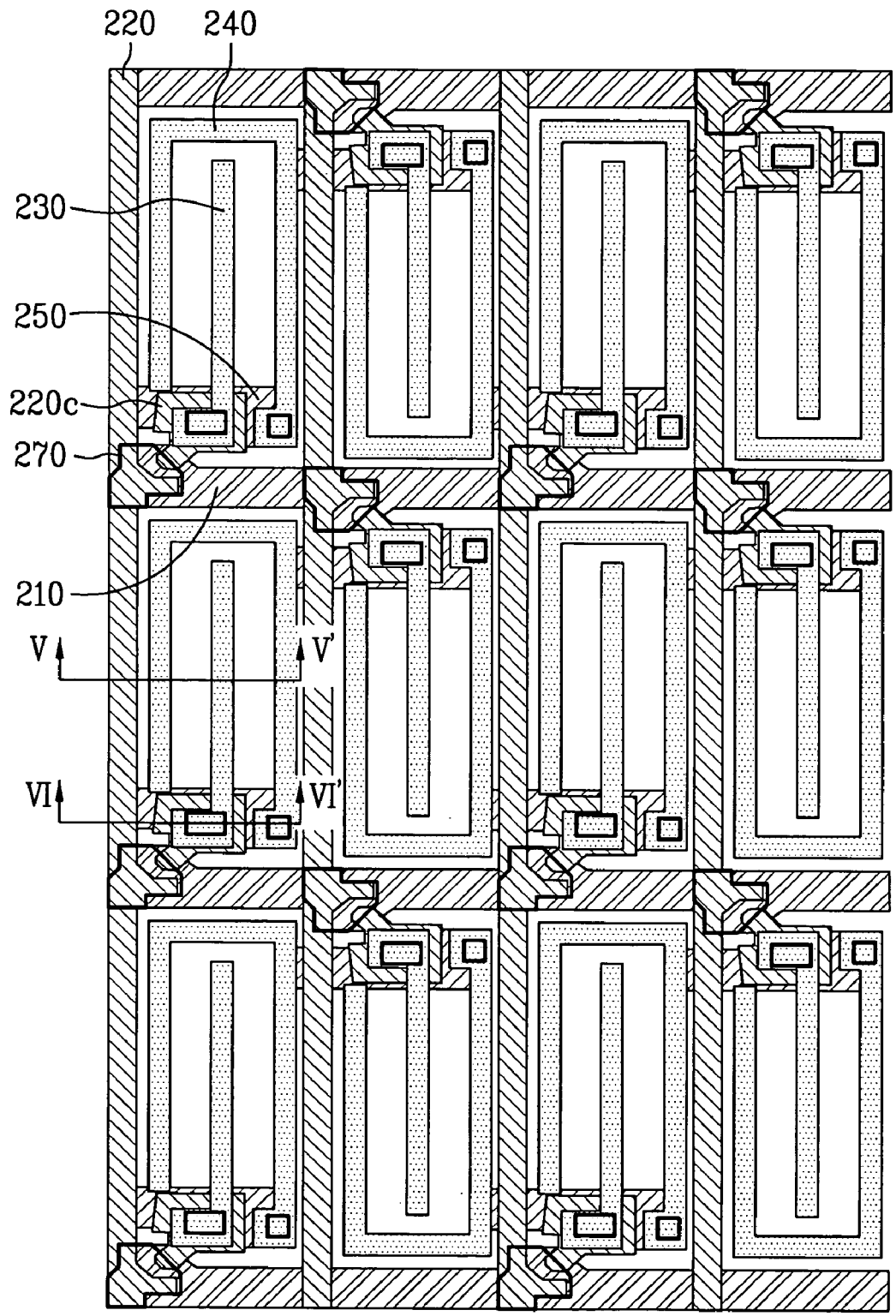
FIG. 13 shows a layout illustrating a pixel structure of an IPS mode LCD device according to a second embodiment of the invention.
Figure 14:
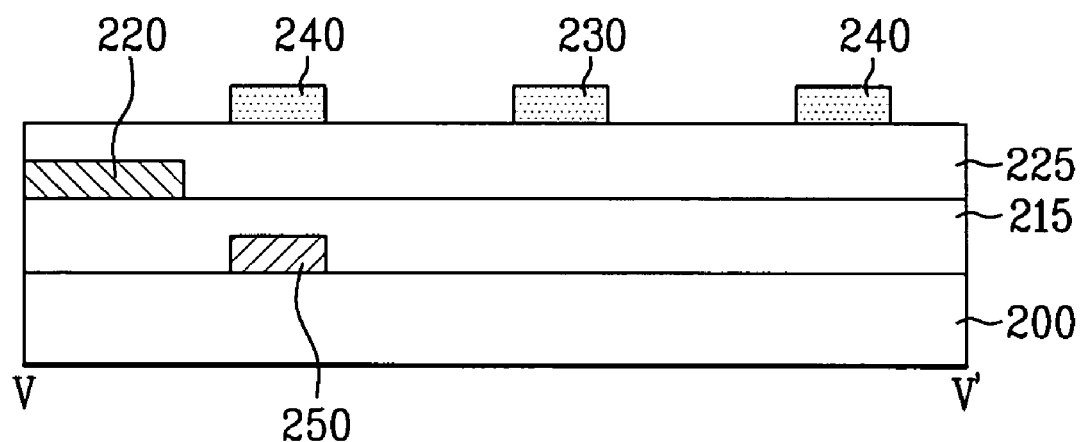
FIG. 14 shows a cross-sectional view taken along line V-V' of FIG. 13.
Figure 15:
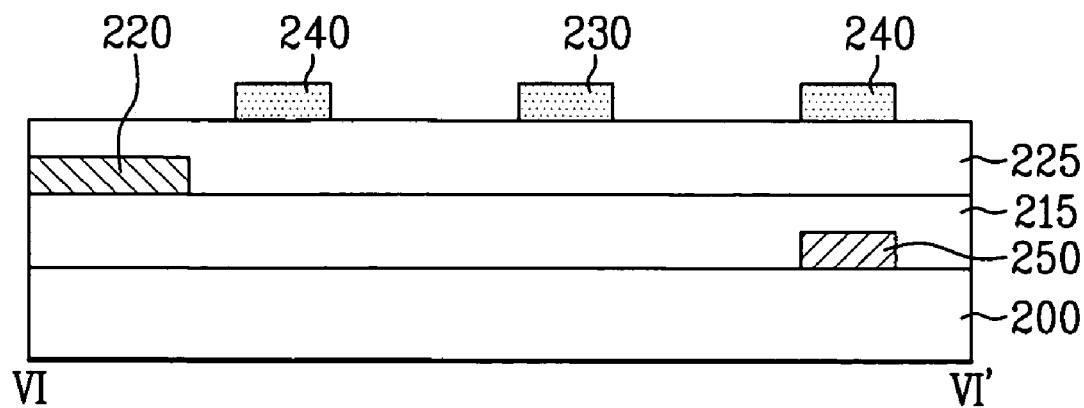
FIG. 15 shows a cross-sectional view taken along line VI-VI' of FIG. 13.

FIG. 13 illustrates a pixel structure of an IPS mode LCD device according to the second embodiment of the invention. FIG. 14 shows a cross-sectional view taken along line V-V' of FIG. 13. FIG. 15 shows a cross-sectional view taken along line VI-VI' of FIG. 13. As shown in FIG. 13 to FIG. 15, the IPS mode LCD device according to the second embodiment of the invention includes multiple gate and data lines 210 and 220, multiple thin film transistors (TFTs), multiple pixel electrodes 230, multiple common (storage) lines 250, and multiple common electrodes 240. The gate and data lines 210 and 220 cross each other, thereby forming multiple pixel regions. The thin film transistors TFTs are respectively formed at crossing portions of the gate and data lines to be alternately positioned at lower and upper side pixel regions adjacent to the corresponding gate line 210. Also, the pixel electrodes 230 connect to drain electrodes of the respective TFTs, and the pixel electrodes 230 are respectively formed in the pixel regions to be in parallel with the data lines 220. The common lines 250 are formed in a zigzag-type configuration to be in parallel with the gate lines 210 along the TFT regions. Also, the common electrodes 240 are respectively formed in the circumferences of the pixel regions at fixed intervals from the respective pixel electrodes 230 to connect to the common lines 250.

In this configuration, the common electrode 240, being adjacent to the left side data line 220 of the pixel region, overlaps the common line 250. The common line 250 includes a first common line and a second common line, where the first common line is formed to be in parallel with the gate line 210 along the respective TFT regions. The second common line is connected to the first common line in parallel with the data line 220 to overlap with the common electrode 240 at the left side of the pixel region. Then, the first common line crosses the right side data line 220 of the pixel region.

In the IPS mode LCD devices according to the first and second embodiments of the invention, two windows are formed between the common electrode and the pixel electrode formed in the pixel region. However, the invention is not restricted to two windows, and it is possible to form four windows, six windows, or more windows in the inventive IPS mode LCD device.

A method of manufacturing the IPS mode LCD device according to the preferred embodiments of the invention will be described below.

First, a metal layer is deposited over an entire surface of a substrate 200, and then the metal layer is selectively removed to thereby form the gate line 210 (having a gate electrode) and the common line 250 at a fixed interval from the gate line 210 in a horizontal direction. At this time, the gate electrodes are alternately formed at lower and upper sides of the adjacent pixel regions along the corresponding gate line 210. Also, the common line 250 is formed at a predetermined interval from the gate line 210 to overlap with the drain electrode and the common electrode in the zigzag-type configuration. Subsequently, a gate insulating layer 215 is formed over the entire surface of the substrate 200 including the gate line 210 and the common line 250. Then, a semiconductor layer (not shown) is formed over the gate insulating layer 215 above the gate electrode. After that, a metal layer is deposited over an entire surface of the gate insulating layer 215, and then selectively removed to thereby form the data line 220 perpendicular to the gate line 210, and source/drain electrodes 220c on the substrate 200. As a result, the TFT (including the gate electrode) the semiconductor layer and the source/drain electrodes 220c is formed on the substrate 200.

Next, a passivation layer 225 is formed over the entire surface of the substrate 200 including the data line 220. After that, a metal layer is deposited over an entire surface of the passivation layer 225, and then selectively removed to thereby form the pixel electrode 230 and the common electrode 240. At this time, the pixel electrode 230 is connected to the drain electrode 220c of the TFT, and the common electrode 240 is connected to the common line 250 at a predetermined interval from the pixel electrode 230. Also, the gate insulating layer is interposed between the drain electrode 220c of the TFT and the common line 250, thereby forming the storage capacitor Cst. In this case, the common electrode 240 overlaps with the common line 250, where the common electrode 240 and the common line 250 contact each other at a predetermined region of the overlapped portion.

Figure 16:
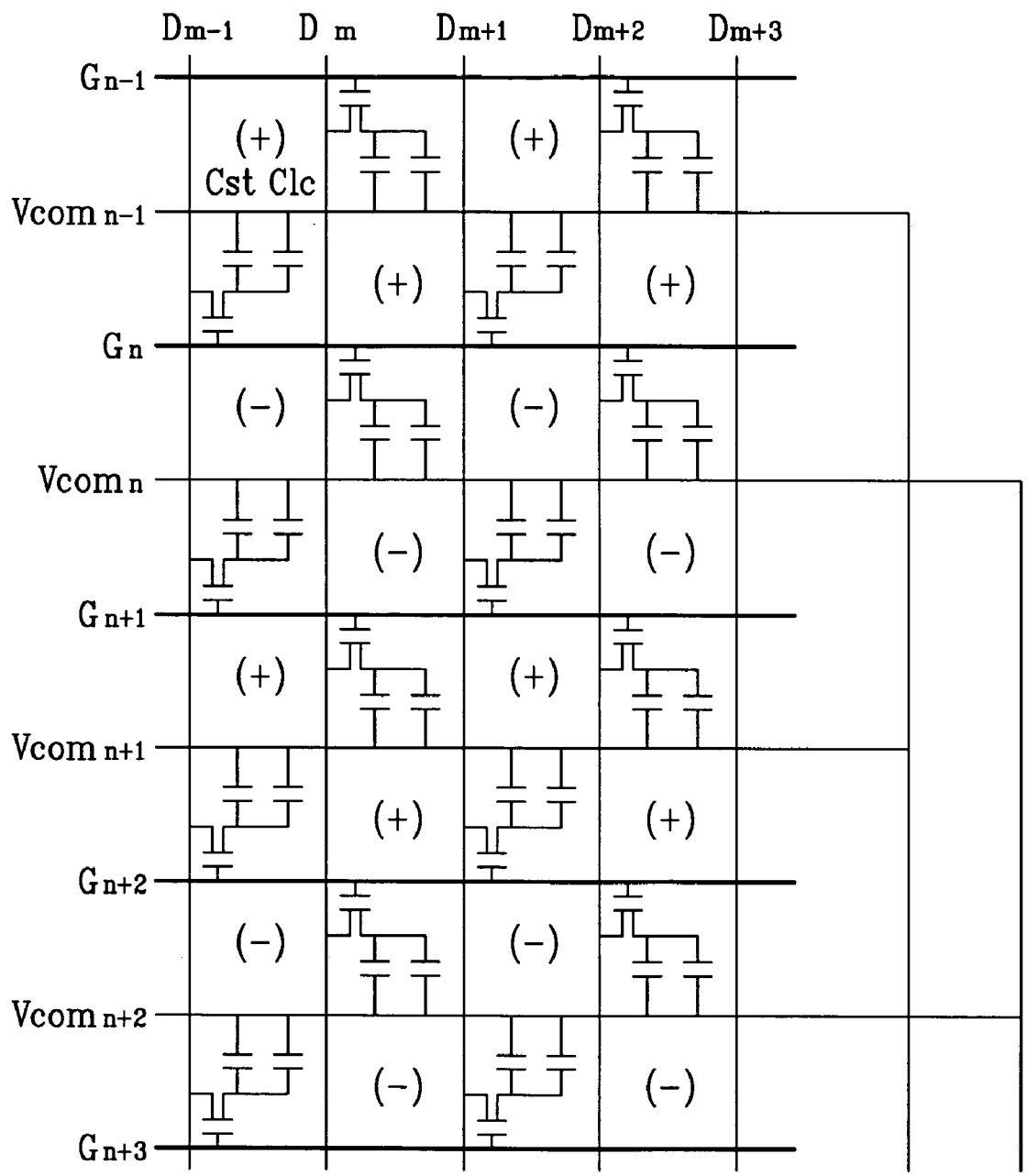
FIG. 16 shows an equivalent circuit diagram of an IPS mode LCD device according to the first and second embodiments of the invention.
Figure 17:
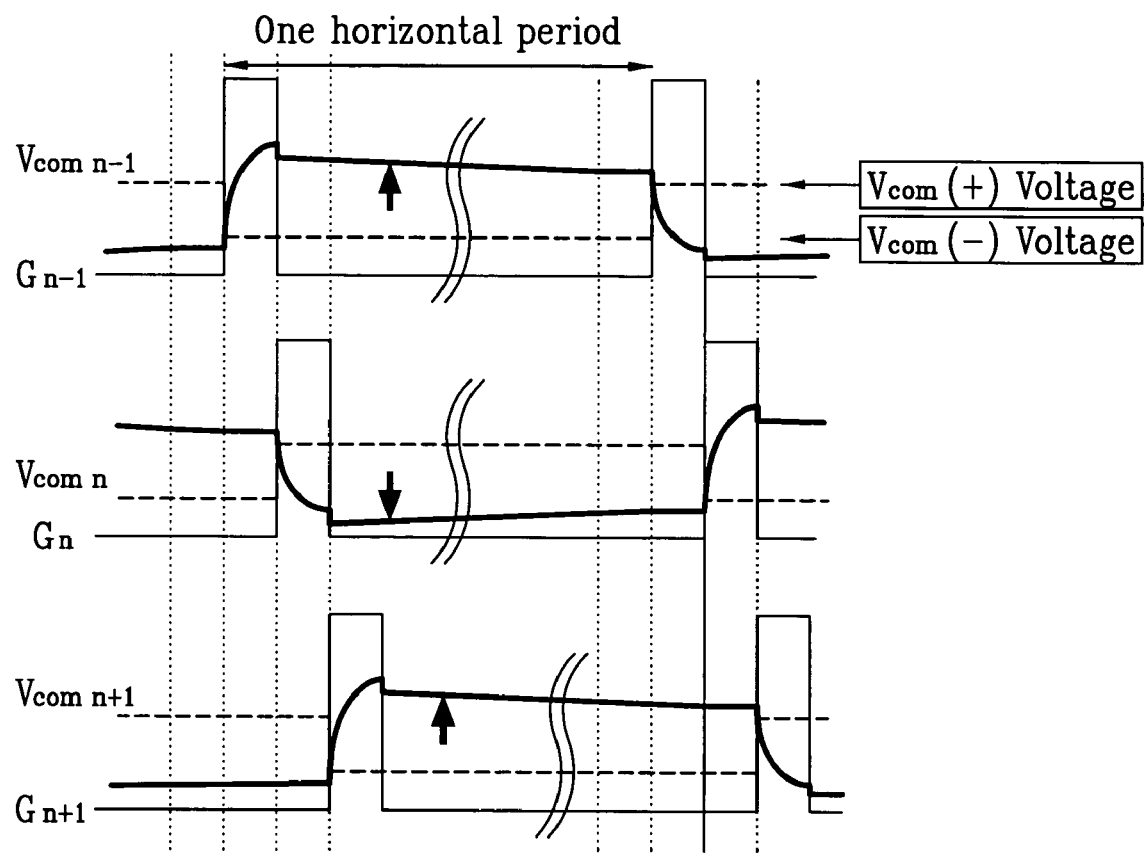
FIG. 17 shows a timing diagram illustrating a pixel voltage to a voltage signal applied to a gate line and a common line in a driving method according to the first embodiment of the invention.

FIG. 16 shows an equivalent circuit diagram of an IPS mode LCD device according to the first and second embodiments of the invention. FIG. 17 shows a timing diagram illustrating a pixel voltage to a voltage signal applied to a gate line and a common line in a driving method according to the first embodiment of the invention.

FIG. 16 shows that when the pixel structure of FIG. 10 or FIG. 13 is incorporated as the equivalent circuit diagram, the common lines are respectively interposed between the adjacent gate lines. That is, the pixel structure of the IPS mode LCD device according to the invention includes multiple gate lines ($G_{n-1} \ldots G_{n+3}$), and multiple data lines ($D_{m-1} \ldots D_{m+3}$). Also, the gate lines cross the data lines. The n-th numbered common line Vcom n is formed between the n-th numbered gate line $G_n$ ($n \geq 1$) and the (n+1)-th numbered gate line $G_{n+1}$. A first thin film transistor is formed at a crossing portion of the (n+1)-th numbered gate line and the m-th numbered data line. A first storage capacitor $C_{st}$ and a first liquid crystal capacitor $C_{LC}$ are formed in parallel between a drain electrode of the first thin film transistor and the n-th numbered common line. Then, a second thin film transistor is formed at a crossing portion of the n-th numbered gate line and the (m+1)-th numbered data line. A second storage capacitor $C_{st}$ and a second liquid crystal capacitor $C_{LC}$ are formed in parallel between a drain electrode of the second thin film transistor and the common line. Here, a first common voltage (or second common voltage) is applied to the odd numbered common lines, and a second common voltage (or first common voltage) is applied to the even number common lines. That is, the voltage is alternately applied. In this state, the same polarity pixel voltage is applied to the pixel regions connected to the same common line.

In the IPS mode LCD device according to the first and second embodiments of the invention (FIG. 10 and FIG. 13), when using a general source driver in a dot inversion method, signals may be supplied to an LCD panel from a gate driver to supply common voltages having different levels, thereby obtaining a rapid response time. In addition, the common lines may be driven in a line inversion method, so that the pixel region may be least affected by electric field distortion from the adjacent pixel region, thereby obtaining improved electro-optic characteristics, such as black luminance.

Applying one scanning signal to the gate line of the corresponding common line synchronizes the odd number common lines. The even numbered common lines are synchronized by applying the other scanning signal to the gate line of the corresponding common line. The same level first common voltage Vcom(−) or the second common voltage Vcom(+) are thereby applied to the odd or even numbered common lines. Upon changing to the next frame, the first common voltage Vcom(−) applied to one common line is level-shifted to the second common voltage Vcom(+), and the second common voltage Vcom(+) applied to the other common line is level-shifted to the first common voltage Vcom(−). That is, the first and second common voltage signals Vcom(−) and Vcom(+) apply alternately to the corresponding common line according to the data voltage applied from the source driver (not shown). Also, the liquid crystal capacitor $C_{LC}$ and the storage capacitor $C_{st}$ are formed in parallel to be alternately positioned at lower and upper side pixel regions adjacent to the corresponding common line Vcom n. As a result, the same polarity pixel voltage applied to the liquid crystal is alternately applied to the lower and upper side pixel regions adjacent to the corresponding common line Vcom n. Accordingly, in the IPS mode LCD device according to the preferred embodiment of the invention, the common voltage signals Vcom(−)Vcom(+) are applied to the corresponding common lines in the line inversion method, and the respective pixels are driven according to the dot inversion method by changing the polarity of the pixel voltage.

If the respective common lines Vcom n in the zigzag-type configurations of FIG. 10 or FIG. 13 are formed, as in the equivalent circuit diagram of FIG. 16, to be in parallel with the respective gate lines Gn, then the TFTs are alternately positioned at lower and upper side pixel regions adjacent to the corresponding gate line Gn. Also, the liquid crystal capacitor $C_{LC}$ and the storage capacitor $C_{st}$ are formed in parallel between the drain electrode of the TFT and the common line Vcom n. As shown in FIG. 16, when a positive (+) polarity data voltage is applied to one pixel, the first common voltage Vcom(−) is applied to the corresponding common line, and the first common voltage Vcom(−) induces in the common electrode connected to the corresponding common line. Meanwhile, when a negative (−) polarity data voltage is applied to one pixel, the second common voltage Vcom(+) is applied to the corresponding common line, and the second common voltage Vcom(+) induces in the common electrode connected to the corresponding common line. That is, the first low level common voltage Vcom(+) is applied to the (n−1)-th numbered common line Vcom n−1 (n>1, 'n' is a positive integer) of a cell to which the positive (+) polarity data voltage is applied, and the second high level common voltage Vcom (+) is applied to the n-th numbered common line Vcom n of a cell to which the negative (−) polarity data voltage is applied. Accordingly, the voltage difference increases between the pixel electrode and the common electrode.

The inventive IPS mode LCD has the common electrode and the pixel electrode being formed on the same plane, thereby generating an electric field parallel to the substrates. That is, as shown in FIG. 17, a scanning signal applied to the gate line and a common voltage signal applied to the common line influences the pixel voltage value. The data voltage supplied to the data line crossing the gate line is applied to produce a negative (−) polarity pixel voltage when the common voltage applied to the common line is in the high level state, for example, by using the first common voltage (Vcom (+)). Also, the data voltage is applied to have the positive (+) polarity pixel voltage in the case of the second common voltage (Vcom(−)). The voltage applied to the common line and the data line is therefore maintained at a constant state for one horizontal period, and then is inversed. In this case, the pixel voltage value of the pixel region is the difference between the data voltage and the common voltage, which is greater than at least the difference (Vcom(+)−Vcom(−)) between the first and second common voltage values Vcom (−) and Vcom(+). Accordingly, in the related art IPS mode LCD device, the data voltage is applied in a state of having the voltage difference from the common voltage at a predetermined level, thereby obtaining a stable polarity in each pixel region by maintaining a level constant common voltage. However, in the inventive IPS mode LCD device, the first and second common voltages are differently set according to the polarity of the pixel region, thereby increasing the margin of the applied data voltage. In addition, the invention makes it possible to narrow the output extent of the source driver supplying the data voltage to the data line.

The aforementioned IPS mode LCD devices according to the first and second embodiments of the invention and the driving method according to the first embodiment of the invention are related to similar patent applications by the applicant (Korean Application Nos. 10-2002-67137 and 10-2002-67138; U.S. patent application Ser. No. 10/695,395 and Publication No. 2004-85503).

Figure 18:
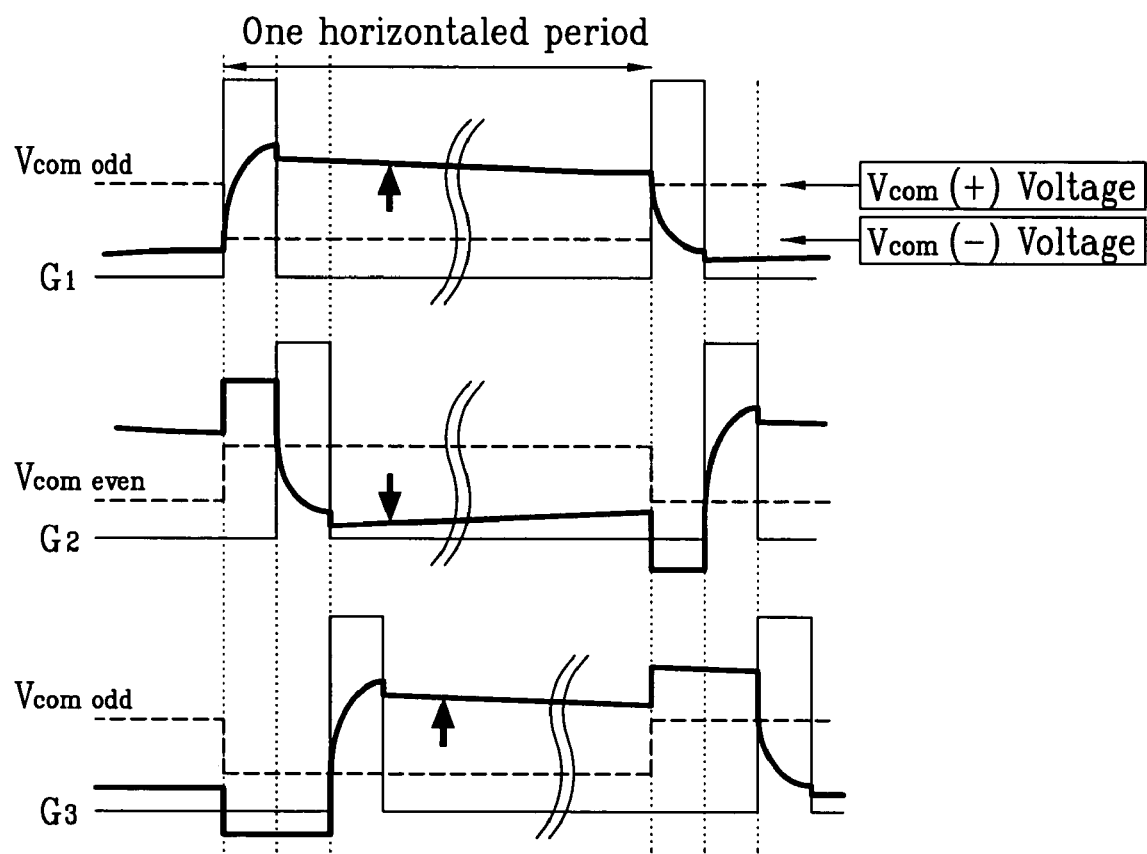
FIG. 18 shows a timing diagram illustrating a pixel voltage to a voltage signal applied to a gate line and a common line in a driving method according to the second embodiment of the invention.

In the inventive IPS mode LCD device shown in FIG. 10 and FIG. 13, one can increase the liquid crystal driving voltage between the common electrode and the pixel electrode. FIG. 18 shows a timing diagram illustrating a pixel voltage and a voltage signal applied to a gate line and a common line in a driving method according to the second embodiment of the invention.

Similar to the driving method explained in FIG. 17, in the inventive method for driving the IPS mode LCD device according to the second embodiment, the first common voltage Vcom(−) (or second common voltage Vcom(+)) is applied the odd numbered common lines Vcom odd, and the second common voltage Vcom(+) (or first common voltage Vcom(−)) is applied to the even numbered common lines Vcom even. In the inventive driving method according to the first embodiment (FIG. 17), the respective common voltages are applied to synchronize with the scanning signal supplied to the gate line corresponding to the common line. On the other hand, in the inventive driving method according to the second embodiment (FIG. 18), the first common voltage Vcom(−) or the second common voltage Vcom(+) is applied in one horizontal period to synchronize with the scanning signal supplied to the first gate line. When the frame is changed, the first common voltage Vcom(−) is level-shifted to the second common voltage Vcom(+), or the second common voltage Vcom(+) is level-shifted to the first common voltage Vcom(−). At this time, the data signal outputs in the same manner as the dot inversion method, where the adjacent data signals are simultaneously outputted having different polarities from each other. That is, the data signal is inverted by one horizontal period and one vertical period. Also, the source output may have the data output voltage for (+) field being lower than the data output voltage for (−) field, and the data output voltage for (−) field may be higher than the data output voltage for (+) field.

The inventive driving method according to the second embodiment maintains the same voltage difference in the liquid crystal of the pixel as that maintained in the driving method according to the first embodiment. However, one observes a capacitance-coupling phenomenon in the liquid crystal voltage supplied to the pixel electrode by inversion of the corresponding common voltage, thereby generating a voltage-shifting phenomenon. Accordingly, one can increase the voltage range applied to the liquid crystal by using the related art dot inversion source drive IC, thereby obtaining a high-quality image having less vertical and horizontal Crosstalk. Also, an IPS mode LCD device having low power consumption becomes possible. The present applicant has applied for a related patent on the driving method according to the second embodiment of the invention (Korean Application No. 10-2003-042830. It will be filed in the United States by Jun. 28, 2004).

However, the inventive driving method according to the second embodiment may have the pixel voltage being lower than Low voltage of the gate driving signal. When the voltage difference between Low voltage of the gate driving signal and the pixel voltage is greater than threshold voltage of the thin film transistor, there may be leakage of the pixel voltage due to leakage voltage.

Figure 19:
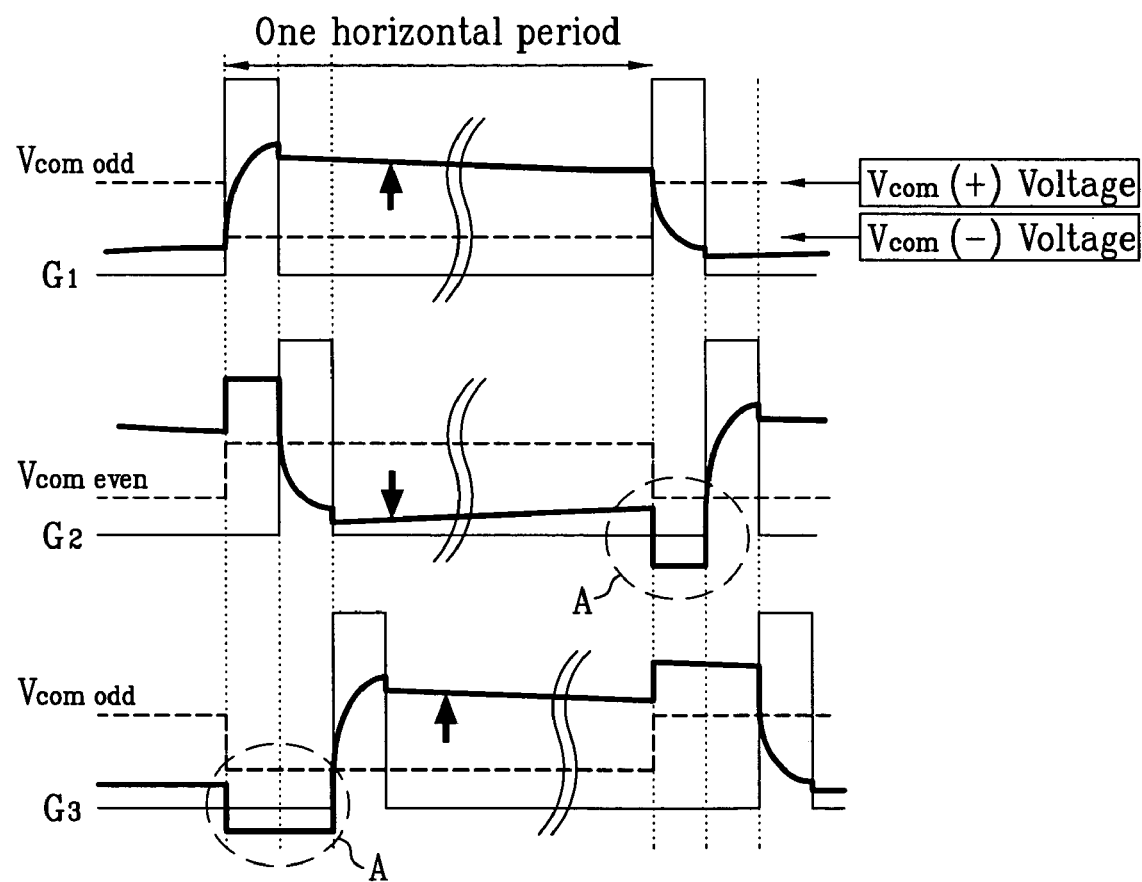
FIG. 19 shows a timing diagram illustrating a pixel voltage to a voltage signal applied to a gate line and a common line, to explain problems of a driving method of FIG. 18.

FIG. 19 shows the portion where the pixel voltage that is lower than the Low voltage of the gate driving signal in a timing diagram that illustrates the pixel voltage to the voltage signal being applied to the gate line and the common line.

As shown in FIG. 19, at a point (A) where the second common voltage Vcom(−) is applied to the common line and the data voltage of negative (−) polarity is applied to the pixel electrode, the pixel voltage becomes lower than the Low voltage of the gate driving signal. If the pixel voltage is lower than the Low voltage of the gate driving signal, and the voltage difference between the Low voltage of the gate driving signal and the pixel voltage is greater than threshold voltage of the thin film transistor, then a leakage voltage generates in the thin film transistor. In other words, if the voltage difference between the source voltage and the drain voltage of the thin film transistor applying the data signal to the pixel electrode according to the driving signal of the gate line is greater than the threshold voltage, then an electric passage generates between the source electrode and the drain electrode of the thin film transistor without regard to the gate driving signal, thereby causing the leakage of the pixel voltage.

Figure 20:
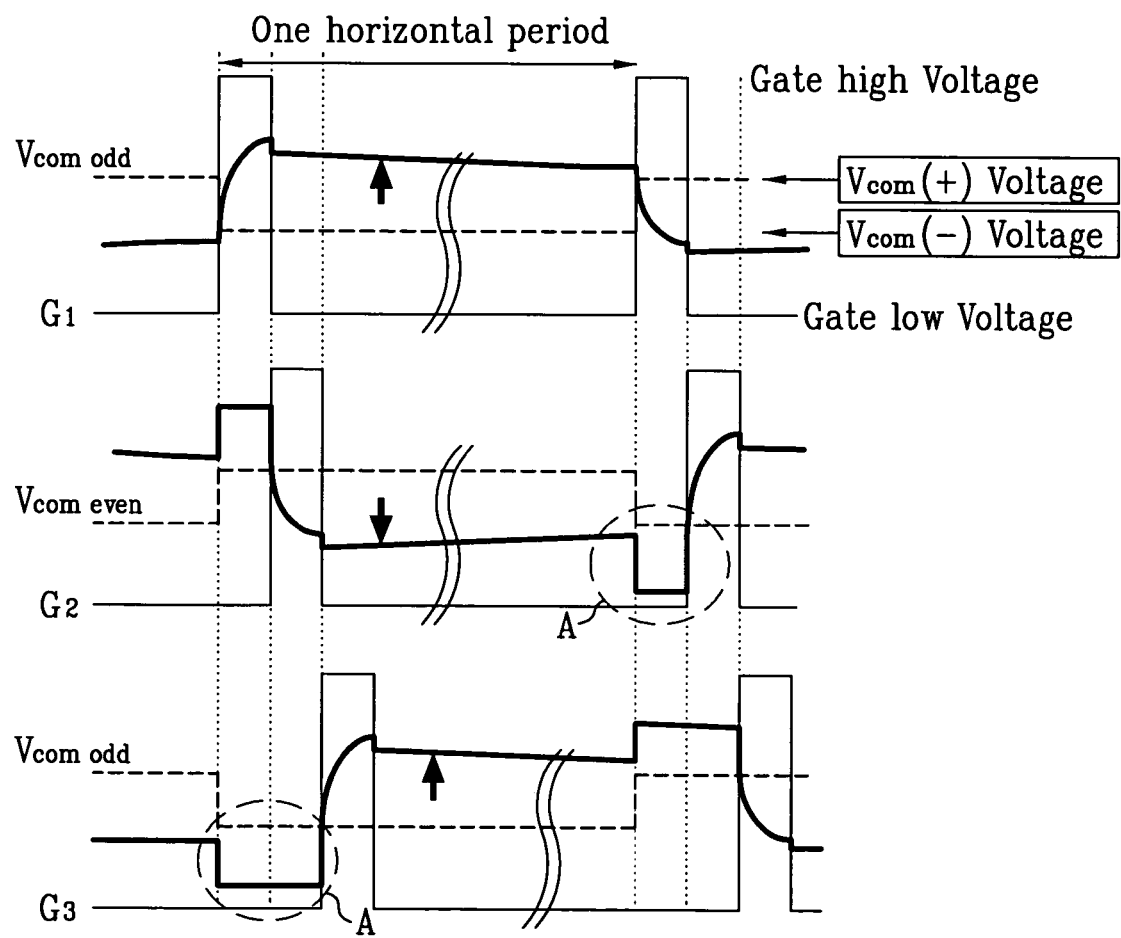
FIG. 20 shows a timing diagram illustrating a pixel voltage to a voltage signal applied to a gate line and a common line in a driving method according to the third embodiment of the invention.

To overcome this problem of the inventive driving method (FIG. 18) according to the second embodiment, a driving method according to the third embodiment of the invention will be described with reference to FIG. 20. FIG. 20 shows a timing diagram illustrating a pixel voltage and a voltage signal applied to a gate line and a common line in a driving method according to the third embodiment of the invention.

To overcome the aforementioned problem, FIG. 20 shows the Low voltage of the gate driving signal being set to be sufficiently low, thereby preventing a leakage voltage of the thin film transistor. However, if the Low voltage of the gate driving signal becomes sufficiently low, then the variation of the pixel voltage increases due to the increasing magnitude of the gate offset voltage ($\Delta VG = V_{GH} - V_{GL}$), thereby deteriorating the picture quality. That is, the variation of the pixel voltage is shown as the following equation, wherein $\Delta Vp$ is the variation of the pixel voltage, $C_{gs}$ is the parasitic capacitance between the gate and source of the thin film transistor, $C_{st}$ is the storage capacitor, $C_{LC}$ is the liquid crystal capacitor, $V_{GH}$ is the High voltage of the gate driving signal, and $V_{GL}$ is the Low voltage of the gate driving signal.

$$\Delta Vp = \frac{C_{gs}}{C_{st} + C_{LC} + C_{gs}} \times (V_{GH} - V_{GL})$$

In the equation above, as the gate offset voltage increases, the variation of the pixel voltage increases. Thus, problems are associated with the method of sufficiently lowering the Low voltage of the gate driving signal, for preventing leakage of the pixel voltage.

Figure 21:
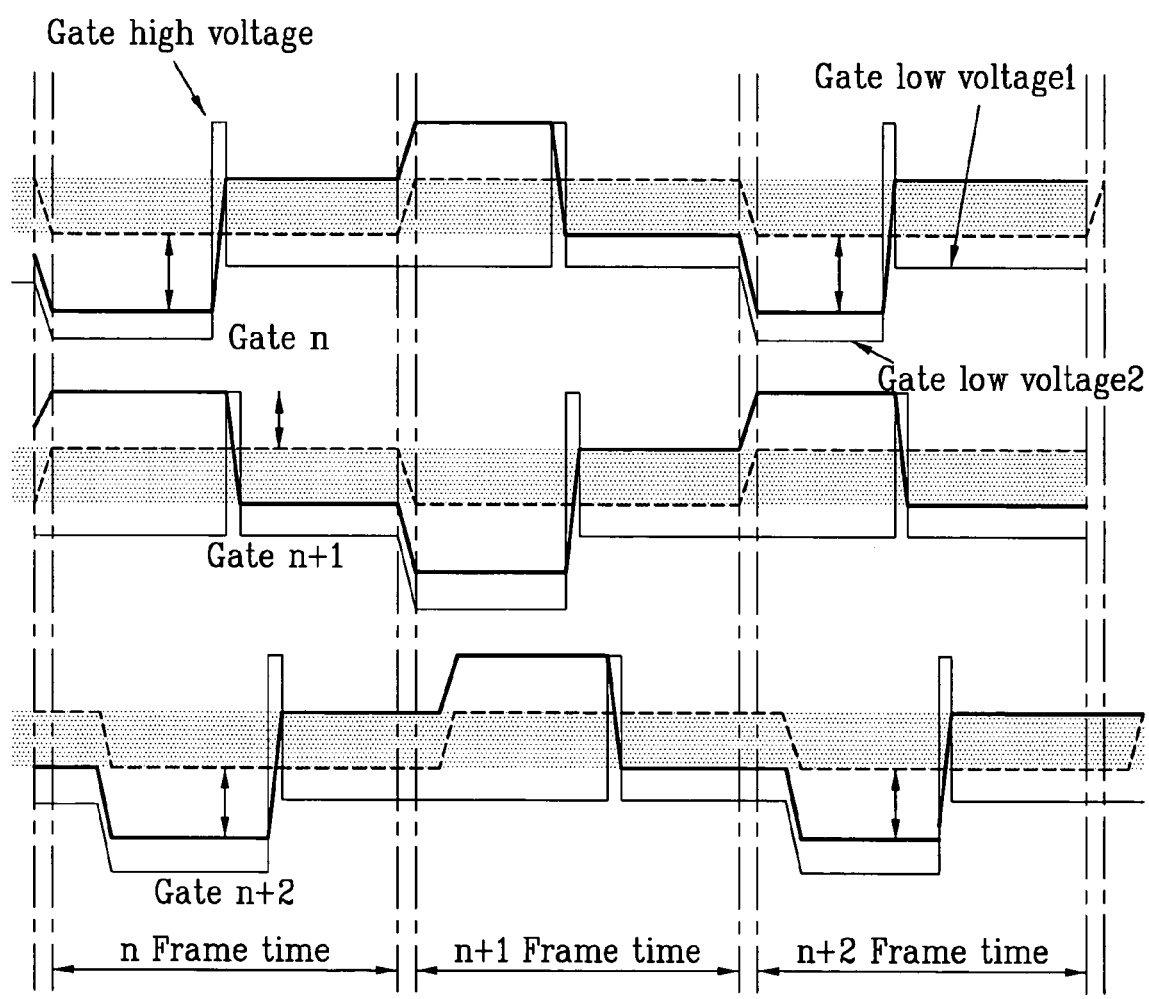
FIG. 21 shows a timing diagram illustrating a pixel voltage to a voltage signal applied to a gate line and a common line in a driving method according to the fourth embodiment of the invention.

To overcome these problems of the inventive driving method according to the third embodiment, a driving method according to the fourth embodiment of the invention will be described with reference to FIG. 21. FIG. 21 shows a timing diagram illustrating a pixel voltage and a voltage signal applied to a gate line and a common line in a driving method according to the fourth embodiment of the invention.

FIG. 21 shows a timing diagram when the gate line and the common electrode are formed in the center of the IPS mode LCD device. As shown in FIG. 21, when the common voltage transits from "High" to "Low" to prevent the falling of the gate offset voltage, the Low voltage of the gate driving signal falls simultaneously, so that the pixel voltage does not fall below the Low voltage of the gate driving signal. During the remaining time period, the Low voltage of the gate driving signal is maintained constantly at the same level as in the related art, thereby preventing an increase of the gate offset voltage.

That is, the driving method of the inventive IPS mode LCD device according to the fourth embodiment applies the first common voltage Vcom(−) (or second common voltage Vcom(+)) to the odd numbered common lines Vcom odd, and the second common voltage Vcom(+) (or first common voltage Vcom(−)) is applied to the even numbered common lines Vcom even. In the inventive driving method according to the fourth embodiment, the first common voltage Vcom(−) or the second common voltage Vcom(+) is applied in one horizontal period (one frame) to synchronize with the scanning signal supplied to the first gate line. When the frame is changed, the first common voltage Vcom(−) is level-shifted to the second common voltage Vcom(+), or the second common voltage Vcom(+) is level-shifted to the first common voltage Vcom(−). The data signal thus outputs in the same manner as the dot inversion method, wherein adjacent data signals are simultaneously outputted in state of having different polarities from each other. That is, the data signal is inverted by one horizontal period and one vertical period. Also, the source output may be such that the data output voltage for the positive (+) field is lower than the data output voltage for the negative (−) field, and the data output voltage for the negative (−) field is higher than the data output voltage for the positive (+) field.

During a gap between the transit point of the common voltage from "High" to "Low" and the High voltage of the gate driving signal in the corresponding gate line, the Low voltage of the gate driving signal of the corresponding gate line simultaneously falls, so that the pixel voltage does not fall below the Low voltage of the gate driving signal. During the remaining time period, the Low voltage of the gate driving signal is maintained constant at the same level similar to the related art, thereby preventing an increase of the gate offset voltage.

As discussed above, the method for driving the IPS mode LCD device according to the third and fourth embodiments of the invention has many advantages, which include the following.

In the inventive method for driving the IPS mode LCD device, the coupling phenomenon of the pixel voltage is generated by a swing of the common voltage. Also, the pixel voltage falls below the Low voltage of the gate driving signal to thereby generate voltage leakage of the thin film transistor. However, when the Low voltage of the gate driving signal falls below the pixel voltage, it becomes possible to prevent leakage voltage of the thin film transistor generated by the coupling phenomenon.

Also, if the Low voltage of the gate driving signal becomes sufficiently low below the pixel voltage, then it is possible to prevent the leakage voltage of the thin film transistor. However, the gate offset voltage of the thin film transistor increases, thereby deteriorating the picture quality by increasing the variation of the pixel voltage. Meanwhile, only when the common voltage transits to "Low", the Low voltage of the gate driving signal falls below the pixel voltage. Therefore, it is possible to prevent deterioration of picture quality generated by the leakage voltage of the thin film transistor and the increase of the offset voltage of the thin film transistor.

It will be apparent to those skilled in the art that various modifications and variations can be made in the invention. Thus, it is intended that the invention covers the modifications and variations of this invention provided they come within the scope of the appended claims and their equivalents.

What is claimed is:

1. A method for driving, comprising:
providing an In-Plane switching (IPS) mode LCD device that includes a plurality of gate and data lines crossing each other to define a plurality of pixel regions, a plurality of thin film transistors (TFT) alternately positioned at lower and upper side pixel regions adjacent to the corresponding gate line, and a plurality of common lines in a zigzag configuration along the thin film transistors in the pixel regions; and
applying a common voltage, wherein a first common voltage or a second common voltage is inversely applied to even numbered common lines or odd numbered common lines in one vertical period, the first or second common voltage being synchronized with a gate High voltage supplied to the first gate line, and the second common voltage lower than the first common voltage,
wherein the gate High voltage and first and second gate Low voltages are applied to each gate line, the second gate Low voltage lower than the first gate Low voltage,
wherein, while the first common voltage is supplied to the corresponding common line, the gate High voltage and the first gate Low voltage are supplied to the corresponding gate line and while the second common voltage is supplied to the corresponding common line, the gate High voltage and first and second Low voltages are supplied to the corresponding gate line,
wherein the first gate Low voltage of the corresponding gate line is changed to the second gate Low voltage when the first common voltage of the corresponding common line is changed to the second common voltage, while the first gate Low voltage of the corresponding gate line is sustained without voltage change when the second common voltage of the corresponding common line is changed to the first common voltage, and
wherein, while the second common voltage is supplied to the common line, the second gate Low voltage of the corresponding gate line is changed to the first gate Low voltage after the next gate High voltage is supplied to the corresponding gate line.

2. The method of claim 1, wherein, the first common voltage and the second common voltage respectively applied to the even numbered common lines and the odd numbered common lines are level-shifted to the second common voltage and the first common voltage whenever a frame is changed.

3. The method of claim 1, wherein the In-Plane switching (IPS) mode LCD device further includes first and second substrates being opposite to each other, and a liquid crystal material layer between the first and second substrates.

4. The method of claim 3, wherein the thin film transistors are formed over the first substrate in a matrix configuration.

5. The method of claim 1, wherein leakage current is prevented.

* * * * *